(12) United States Patent
Zhou (10) Patent No.: US 7,909,608 B2
(45) Date of Patent: Mar. 22, 2011

(54) WORD PROBLEM SOLVING APPARATUS

(76) Inventor: Xu-Shen Zhou, Whitesboro, NY (US)

( * ) Notice: Subject to any disclaimer, the term of this patent is extended or adjusted under 35 U.S.C. 154(b) by 946 days.

(21) Appl. No.: 11/602,694

(22) Filed: Apr. 30, 2007

(65) Prior Publication Data

US 2008/0268406 A1  Oct. 30, 2008

(51) Int. Cl.
*G09B 19/02*  (2006.01)
(52) U.S. Cl. ........................................... 434/188
(58) Field of Classification Search .................. 434/188, 434/190, 191, 192, 193, 205, 209, 211
See application file for complete search history.

(56) References Cited

U.S. PATENT DOCUMENTS

| | | | | |
|---|---|---|---|---|
| 3,514,873 A | * | 6/1970 | Stobbe Paul J | 434/190 |
| 5,366,378 A | * | 11/1994 | Johannsen et al. | 434/187 |
| 5,769,639 A | * | 6/1998 | Foster | 434/159 |
| 5,865,627 A | * | 2/1999 | Foresman | 434/193 |
| 5,902,114 A | * | 5/1999 | Erickson | 434/188 |
| 6,159,329 A | * | 12/2000 | Tschanz | 156/277 |
| 6,196,847 B1 | * | 3/2001 | Karunamuni | 434/188 |
| 6,856,318 B1 | * | 2/2005 | Lewak | 345/473 |
| 7,500,852 B2 | * | 3/2009 | Wolf et al. | 434/188 |
| 7,645,139 B1 | * | 1/2010 | Green et al. | 434/209 |
| 2003/0170595 A1 | * | 9/2003 | Thompson | 434/159 |
| 2008/0108030 A1 | * | 5/2008 | Bayne | 434/188 |

* cited by examiner

*Primary Examiner* — Kurt Fernstrom
(74) *Attorney, Agent, or Firm* — David Giglio, Esq.

(57) ABSTRACT

The present invention provides an apparatus that assists a student with learning how to solve word problems, including cash flow type problems, by using the sense of touch to establish a greater pattern of formula recognition and usage. The word problems include a finite set of constant values for a predetermined number of variables. The apparatus includes a preliminary equation that is presolved for a particular set of values. A final equation is also presolved for the particular set of values. The preliminary equation and final equation are movably placed onto a work area which preferably includes a measurement line.

20 Claims, 11 Drawing Sheets

FIG. 1

$t = 3 \quad C = \$100 \quad r = 10\%$ $PV_a = C \cdot PVIFA(r, t)$ $= C[1 - 1/(1+r)^t]/r$ $= 100[1 - 1/(1+.1)^3]/.1$ $= \$248.68$

FIG. 2

$t = 5 \quad C = \$100 \quad r = 10\%$ $PV_b = C \cdot PVIFA(r, t)$ $= C[1 - 1/(1+r)^t]/r$ $= 100[1 - 1/(1+.1)^5]/.1$ $= \$379.07$

FIG. 3

$PV = FV \ast PVIF\ (r, td)$
$= PV_a / (1+r)^{td}$
$= 248.68 / (1+.1)^3$
$= \$186.83$

FIG. 4

$PV = FV \ast PVIF\ (r, td)$
$= PV_a / (1+r)^{td}$
$= 248.68 / (1+.1)^4$
$= \$169.85$

FIG. 5

$PV = FV \ast PVIF\ (r, td)$
$= PV_a / (1+r)^{td}$
$= 248.68 / (1+.1)^6$
$= \$140.37$

FIG. 6

$PV = FV \ast PVIF\ (r, td)$
$= PV_a / (1+r)^{td}$
$= 248.68 / (1+.1)^7$
$= \$127.61$ $$PV = FV * PVIF(r, td)$$
$$= PV_b / (1+r)^{td}$$
$$= 379.07 / (1+.1)^3$$
$$= \$284.80$$

FIG. 7

$$PV = FV * PVIF(r, td)$$
$$= PV_b / (1+r)^{td}$$
$$= 379.07 / (1+.1)^4$$
$$= \$258.90$$

FIG. 8

$$PV = FV * PVIF(r, td)$$
$$= PV_b / (1+r)^{td}$$
$$= 379.07 / (1+.1)^6$$
$$= \$213.97$$

FIG. 9

$$PV = FV * PVIF(r, td)$$
$$= PV_b / (1+r)^{td}$$
$$= 379.07 / (1+.1)^7$$
$$= \$194.52$$

WORD PROBLEM SOLVING APPARATUS

FIELD OF THE INVENTION

The present invention relates generally to the field of solving word problems and, more particularly, to a method and apparatus of utilizing the sense of touch to improve the understanding of solution techniques for word problems.

BACKGROUND OF THE INVENTION

In the universities, students are generally taught problem solving through various methods and apparatus. The most obvious is the lecture and text book method. A student is assigned to read a chapter and asked to solve problems at the end of the chapter. After reading the chapter, many students will look back through the chapter for various formulae and attempt to apply those formulae to word problems.

In conjunction with this, a teacher will also give a lecture on the subject in which the student may take notes, including various formulae, and also use the notes to help solve the word problems. Thus, a particular subject should now contain one set of formulae in the text book and another set in the students notebook, preferably the same set as in the text book.

Usually teachers do not have enough time in class to show more examples and students do not have enough time to practice more examples at home. There is also a problem of remembering what was said so that the classroom notes often don't make sense to many students. Further, the student will not actually touch the formulae. He or she will have seen and written the formulae, but will have not actually touched or otherwise manipulated the formula.

In terms of sense of touch, muscle memory and hand-brain coordination are an integral component of sports training, which is traced back to human beings learning abilities developed over millions of years of evolution. As Confucius once prophesied:

"I hear and I forget
I see and I remember
I do and I understand."

Another problem with the traditional teaching method is that a calculator is still required to solve the problems which is time consuming and requires extra equipment. Many students have problems starting and setting up word problems for several reasons. First, they often have a hard time deciding which formulae to choose. Also, they have a hard time reading which results in not quite understanding the book and how to use the formulae.

Yet still a problem arises because many students do not understand how to enter data into a calculator for a particular complex formula. Even when such calculation are performed through a calculator there is much writing and manipulating which results in a majority of time being wasted performing calculations.

By way of example, time value of money is one of the most important concepts in finance. It is usually discussed briefly in the prerequisite course for an introductory corporate finance course such as Financial Accounting or Managerial Accounting. It is more formally treated at the early chapters in Introduction to Corporate Finance and subsequently used heavily in bond and stock valuations, capital budgeting such as calculating Net Present Value of investment projects in the later chapters.

Students often have extreme difficulty with cash flow patterns such as annuities, lump sum, perpetuity and dividend constant-growth cash flow patterns, such as in determining stock valuations.

In these subject matters, students commonly make two mistakes. First, many students do not understand exactly where the present value obtained from the formulas or calculator occurs on a time line, then often conclude that the present value is the value today, but it is often the value at some time in the future or in the past. Thus, once they determine the dollar amount from the present value calculation formula, no matter in what years the cash flows occur, they simply put that amount on year zero without further discounting it to the present.

The second mistake which is more common than the first mistake, is that while some students understand that the future cash flows need to be discounted to get the present value, they do not know the correct time periods used for discounting. For example, if the first payment of an annuity is made in year ten then some students mistakenly conclude that the present value will be also at year ten instead of at year nine.

These two common mistakes are typically the result of not performing enough practice problems.

SUMMARY AND OBJECT OF THE PRESENT INVENTION

It is an object of the present invention to improve the field of word problems.

It is another object of the present invention to use the sense of touch to help students understand and improve word problems.

It is a further object of the present invention to teach student to focus on the general methods of solving word problems rather than in performing calculations.

It is yet a further object of the present invention to reduce the time for calculations so that more problems are practiced during a given time.

It is still yet a further object of the present invention to improve accounting instruction techniques for teaching how to use present value formulas and cash flow patterns.

It is still another object of the present invention to improve the art of teaching students how to calculate present value for cash flow problems using the sense of touch.

It is yet another object of the present invention to improve the art of teaching students the correct time periods used for discounting annuities using the sense of touch.

It is still yet another object of the present invention to teach students how to take an improved approach to understanding and solving word problems.

It is a feature of the present invention to provide formulas which are movable by the hand.

These objects and features are provided for in the present invention in which a problem solving apparatus for assisting a students approach and understanding into solving word problems includes at least one movable preliminary substrate having indicia of at least one preliminary equation disposed thereon. The preliminary equation is useful for solving a first component for the problem at hand. There is also provided at least one movable final substrate having indicia of at least one final equation disposed thereon, wherein the at least one final formula equation is a function of an equation of said at least one preliminary equation. Thus, a final solution to the problem is determined by solving the preliminary equation and then the final equation.

The apparatus further includes a work area having a solution surface in which the preliminary substrate and the final substrate are separately superposed. In use the student selects the proper preliminary equation(s) and the proper final equation(s) and places them into a solution position on the work area.

In a preferred embodiment all of the components are magnetic which provides for improved manageability and prevents to loss of components when the apparatus is not in use.

The solution surface further includes a measurement line indicia disposed thereon, which can be either a time line or a distance line. The measurement line helps the user visualize through the sense of touch the interrelationship of the equations in time and space.

In certain embodiments, the preliminary substrate includes an outer surface having a first contour and the final substrate having a second contour, wherein at least a portion of the first contour mates with at least a portion of the second contour. This forces the user to select equations which work together as improperly selected equations will not properly fit.

In another embodiment, the preliminary substrate includes a predefined colored background, and wherein the final substrate includes a predefined colored background, and wherein the colored backgrounds unites by definition. This forces the user to select equations which work together as improperly selected equations will not properly match.

The apparatus further includes a data substrate having indicia of at least one set of data, wherein the data includes a value for at least one variable the preliminary equation or final equation.

In a preferred embodiment preliminary equation and the final equation are pre-solved for predetermined variables. This allows the user to work through many more word problems in a given set of time, thus increasing the understanding of the subject matter.

This invention is particularly well suited for assisting a students approach and understanding into solving cash flow related word problems. The preliminary substrates have indicia of at least one preliminary equation disposed thereon of which the preliminary equation is determinative for solving the present value of cash flow of a predetermined distribution amount, for a predetermined duration, with a predetermined interest rate.

The final substrate has indicia of at least one final equation disposed thereon, wherein the final formula indicia is determinative for the solution of the present investment value required to produce a future cash flow of the predetermined distribution amount, for the predetermined duration with the predetermined interest rate, and wherein the final equation is a function of the preliminary equation.

A data substrate has indicia of the predetermined distribution amount for the predetermined duration, wherein the predetermined distribution amount includes equidistant spaced equal installment amounts.

The work area solution surface further includes a timeline disposed thereon, wherein the timeline includes equidistant spaced consecutive numbered integers which correspond to years, such that the equidistant spaced installment amounts between adjacent installments and the equidistant spaced integers between adjacent integers are separated by the same physical distance.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

The present invention will now be described in accordance with a preferred embodiment pertaining to cash flow type subject matter. It will also become apparent to one skilled in the art of teaching that the application of the present invention may also be used in other areas of study pertaining to subject matter having word problems.

By way of example, two cash flow concepts will be introduced. One type of cash flow is called lump sum. The payment occurs only at one point in time. The present value of a lump sum is calculated by the formula in equation [1]:

$$PV = FV * PVIF(r,t) \qquad [1]$$

where FV is the lump sum payment occurring at year t. FIGS. 3-10 use this formula. PV is the present value and PVIF is the present value interest factor which is a function of the interest rate r and the duration t, equated as follows in equation [2]:

$$PVIF(r,t)=1/(1+r)\uparrow t \quad [2]$$

The other type of cash flow is called an annuity. It is a finite series of equal payments that occur at regular intervals and the payments occur at the end of the period.

Mortgage payments are an example of an annuity. For mortgage payments, the bank or mortgagee makes a lump sum payment on the behalf of the mortgagor for the purchase of a house. The mortgagor then makes a monthly payment after the conclusion or expiration of each month to the mortgagee, based upon the value of the lump sum, the duration of the payments and the prevailing interest rate until the mortgage or lump sum amount is satisfied. These monthly mortgage payments can also be regarded as annuity installments.

Figure 1:
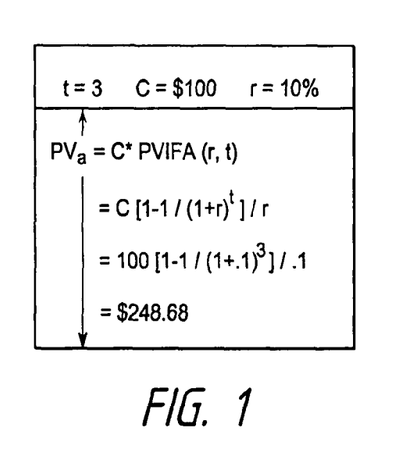
FIG. 1 is a formula depicting the present value for cash flow for annual payments of $100 over a three year period at an interest rate of ten percent (a three-year annuity with $100 annual payments)
Figure 2:
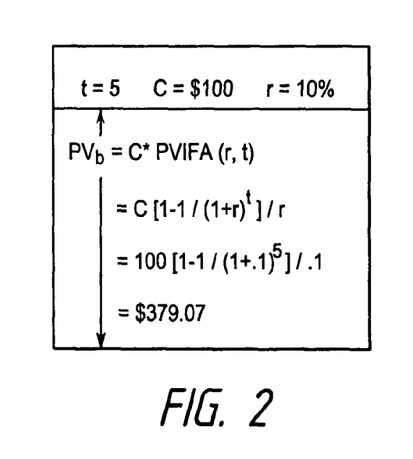
FIG. 2 is a formula depicting the present value for cash flow for annual payments of $100 over a five year period at an interest rate of ten percent (a five-year annuity with $100 annual payments)

FIGS. 1 and 2 show this type of cash flow with a 3-year annual distribution type annuity (t=3) in FIG. 1 and 5-year annual distribution type annuity (t=5) in FIG. 2. The present value of an annuity is calculated by equation [3]:

$$PVa \text{ or } (PVb)=C*PVIFA(r,t) \quad [3]$$

Since payments occur at the conclusion or expiration of a particular time period, the present value of an annuity, also referred to as PVa or (PVb) occurs or is evaluated at one year before which payment is set to begin. C is a payment amount, which is set to the value of $100 for the examples described herein. PVIFA is the present value interest factor of the annuity which is still a function of the interest rate r and duration of payments t, equated as follows in equation [4]:

$$PVIFA(r,t)=[1-1/(1+r)\uparrow t]/r \quad [4]$$

Invariably, some students mistakenly put PVa in the same year as the year the payments begin. Some students even put PVa at the year 0 disregarding when the first payment begins.

The sense of touch is designed to help students avoid this mistake by creating correct "hand-brain coordination" or "muscle memory" as coaches train athletes to do. The muscle memory makes it easier for students to remember to place the formulas of FIGS. 1 and 2 in a year before which first payment begins. In contrast, it is more difficult for students to grasp this concept from just reading the text book, listening to lectures and writing examples.

Thus, the two concepts of present value of a lump sum and present value of an annuity are now provided with formulas and solutions for those formulas having predetermined constant values over a finite sample range of number of years before payment is made, number of years of equal installment payments, amount of such installment payments, interest rate [r] and a lump sum value at a particular time.

The formulas and solutions for those formulas are provided on movable substrates, such as cardboard or in the preferred embodiment imprinted onto a magnetic member of a suitable dimension. The suitable dimension should be such that many different formulas and solutions to those formulas will fit onto a suitable work area, which in preferred embodiment is also magnetic.

Figure 13:
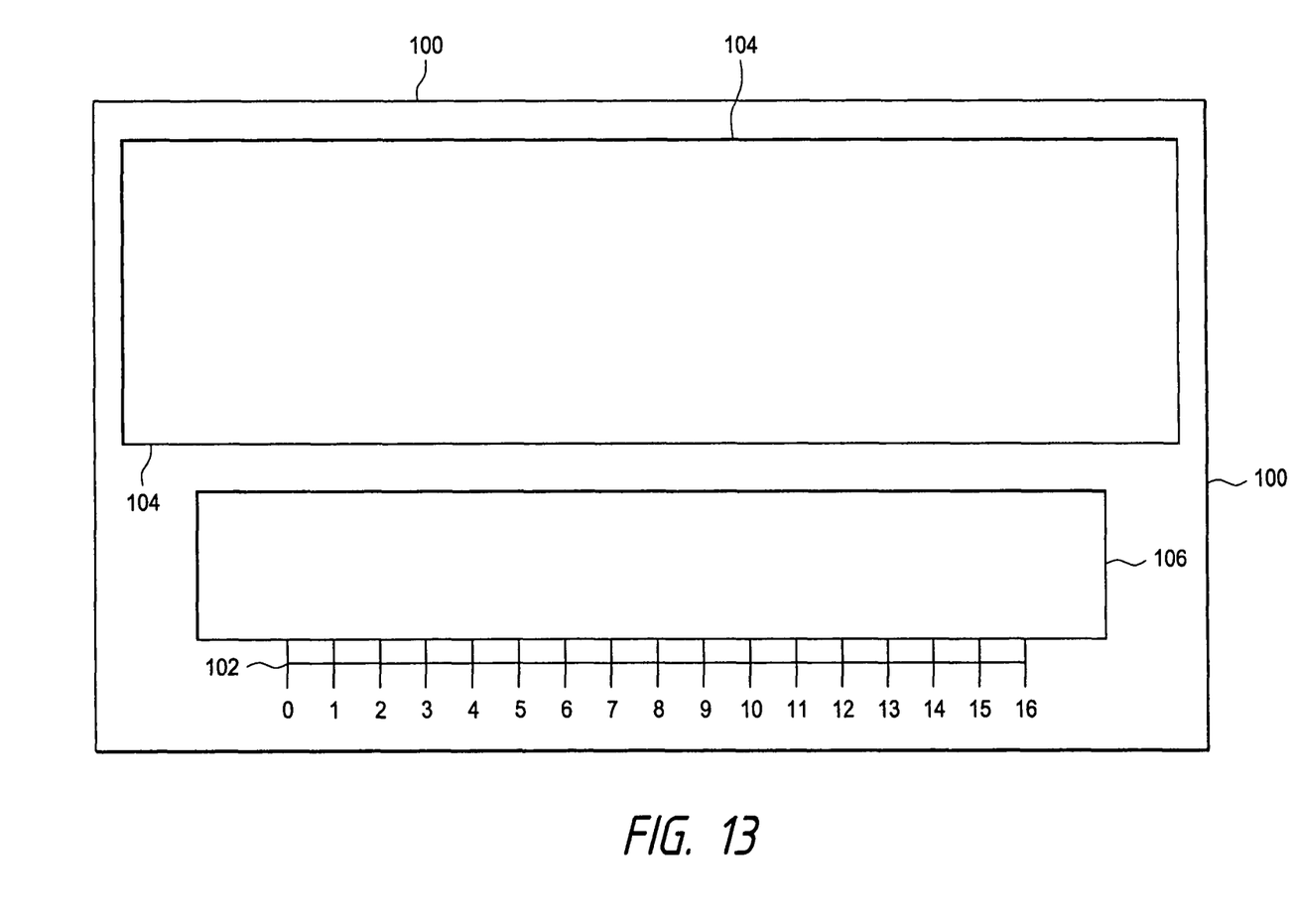
FIG. 13 is a diagram of a work area in accordance with a preferred embodiment of the present invention.

A work area 100 depicted in FIG. 13 includes a timeline 102 imprinted thereon in which a predetermined number of consecutive integers are equidistantly spaced. The timeline 102 begins at zero denoting the present date and continues sequentially through a pre-selected term of fifteen years. Each integer represents a single installment time period. In the case of the examples presented herein each integer represents a year.

The magnetic features of both the movable formulas 110, depicted in FIG. 13, and the work area serves two functions. First, the magnetic attraction holds the formulas in placement on the work area so that they are not easily dislodged by movement of the work area, which is typically portable.

Figure 14:
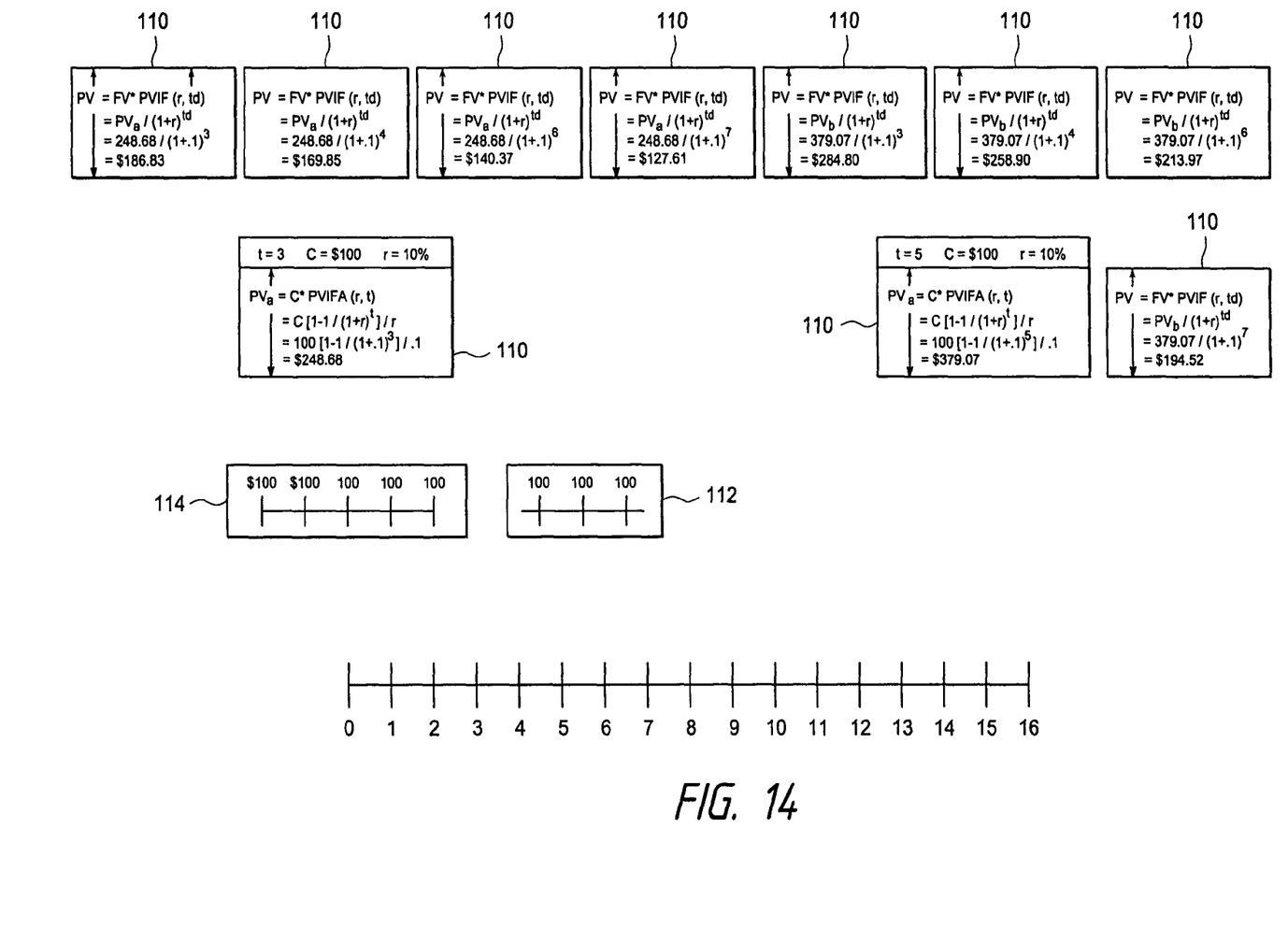
FIG. 14 is a diagram of the work area of FIG. 13 in which the formulae of FIGS. 1-10 and the distribution bars of FIGS. 11 and 12 are depicted thereon in a staging area.

The work area also 100 includes a staging area 104 in which the unused formulas are stored, which is depicted in FIG. 13, although the outline of the staging area 104 is not depicted in FIG. 14 nor is the outline necessary for the purposes of the present invention. The work area 100 further has an interactive area, wherein the student places the formulas that are being manipulated for the word problem in question.

A second advantage of the magnetic components is that the apparatus herein which comprises the work area 100 and several small formula 110 will be kept together easily with repeated uses. When a student uses the apparatus it is taken from storage and the formulae 110 are manipulated in various ways. When the instruction period is ended, the apparatus must be returned to the storage area.

It is during the put back period that formulae 110 not having an chemical or electrical affinity to a work area 100 will become displaced therefrom and inevitably lost. Thus, the magnetic attraction between the formula 110 and the work area 100 prevents such displacement. Therefore, after repeated usage, the formulae 110 should always be magnetically connected to the work area 100.

Referring now to FIGS. 1 through 10, there is depicted a pre-solved set of formula for a problem set designed to determine present value or future payment of a particular annuity in which payments C occur annually at a preselected one hundred dollar annual distribution and a pre-defined interest rate r of ten percent. It will become obvious and apparent after further reading that the pre-solved set of formula can be expanded to include additional or varying payment amounts and additional or varying interest rates.

FIG. 1 shows a formula for the present value of cash flow or an annuity PVa and solution of the formula for a present value for cash flow of a first duration, namely t=3 or three years. It should be understood that the terms cash flow and annuity are mutually interchangeable in the context of the preferred embodiment of the present invention. In the formula shown in FIG. 1, C* is defined as an annual payment amount and has been predetermined to be $100.00. PVIFA is defined as a present value interest factor of the annuity and is determined according the equation $[1-1/(1+r)\uparrow t]/r$ where t is the duration in years and r is the interest rate. According the parameters of the equation of FIG. 1 the interest rate has been set at 10%. Thus, PVa is solved for such predefined parameters and has value of $248.68.

Therefore, for all word problems in a problem set Which include an interest rate of 10%, an annual payment of $100 and a time duration for the annual payments of three years, the present value of the annuity PVa is presented as a formula having variables and constants, and then pre-solved to a value of $248.68, depicted in FIG. 1. The student manipulates the formula by hand, and in doing so, observes the actual structure of the formula and how the variable and constants are interrelated therein. Since the formula is pre-solved, the student saves a great deal of time in performing laborious calculations. Therefore, many more word problems may be presented in given time.

FIG. 2 shows a formula for the present value of an annuity PVb and a pre-solved solution thereof, in which, the duration of payments [t] is now five years. In the formula shown in FIG. 2, C* is again defined as an annual payment amount and has also been predetermined to be $100.00. PVIFA is still defined as a present value interest factor of the annuity and is determined according the equation $[1-1/(1+r)\uparrow t]/r$ where t is the duration in years and r is the interest rate. According the parameters of the equation of FIG. 2 the interest rate has been set at 10%. However, the time [t] is now set to five. Thus, PVb is solved for such predefined parameters and has value of $379.07.

The equations in FIGS. 1 and 2 are preliminary equations which are then used to solve a final equation. Referring now to FIGS. 3-10, there are shown final equation types which can be combined with each other through addition to produce solutions of present value or future value according to a predetermined problem set.

Figure 3:
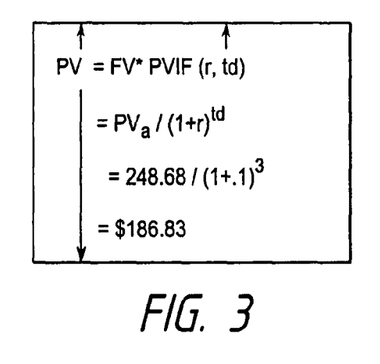
FIG. 3 is a formula depicting the present value for a $248.68 lump sum cash flow at year three.
Figure 4:
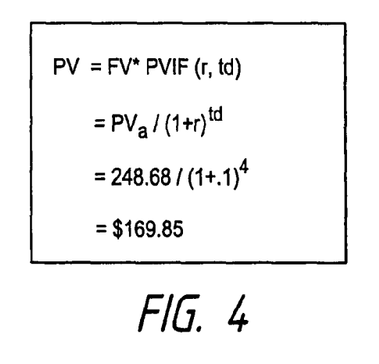
FIG. 4 is a formula depicting the present value for a $248.68 lump sum cash flow at year four.

Turning to FIG. 3 there is depicted a formula for a present value PV which is the present investment required to produce a future cash flow or annuity. The present value PV is determined from a present value for cash flow or annuity having a payment duration of three years, defined in FIG. 1, in which payments are not to begin until the expiration of the fourth year multiplied by a present value interest factor PVIF which is defined by $1/(1+r)\uparrow t$ where r is the interest rate at 10% and t the number of years for which payments will be received. For the equation of FIG. 3, td is the number of years which must expire before the lump sum investment of FIG. 1 would otherwise have to be made to begin receiving payments in FIG. 4. Therefore, the present investment is a function of the lump sum investment and the number of years which must expire before the lump sum would otherwise be invested. The formula is pre-solved to a value of $186.83 so that the student does not need to make laborious calculations to solve the problem. Turning now to FIG. 4 there is depicted a formula for a present value PV required to produce a cash flow having duration of three years, defined in FIG. 1, in which annual payments of $100 are not to begin until the expiration of the fifth year of the present investment. Similarly, the present investment is a function of the lump sum which would otherwise have to be invested at the end of the fourth year, still defined in FIG. 1, to produce the three year cash flow for years ending fifth through seventh. Thus, the present investment value for a ten percent interest rate and according to the parameters defined for FIG. 4 is $169.85.

Figure 5:
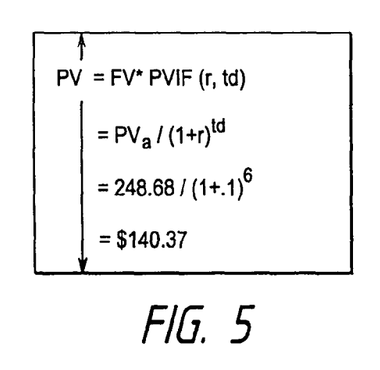
FIG. 5 is a formula depicting the present value for a $248.68 lump sum cash flow at year six.

Turning now to FIG. 5 there is depicted formula for a present value PV which is determined from a present value for cash flow having a duration of three years, defined in FIG. 1, in which payments are not to begin until the expiration of the seventh year multiplied by a present value interest factor PVIF. Again, PVIF is defined by $1/(1+r)\uparrow td$ where r is the interest rate, predefined at 10%, and [td] is the number of years which must expire before payments are set to begin, which is the case of FIG. 5 is six years. Thus, the pre-solved present value according to the parameters defined for FIG. 5 is $140.37, which is the present investment amount for a $100 distribution in years seven through nine.

Figure 6:
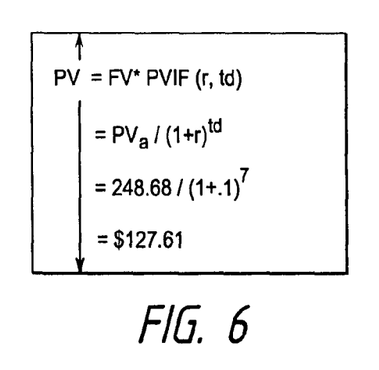
FIG. 6 is a formula depicting the present value for a $248.68 lump sum cash flow at year seven.

Now turning to FIG. 6 there is depicted a formula for a present value PV which is determined from a present value for cash flow or an annuity having a duration of three years, defined in FIG. 1, in which payments are not to begin until the beginning of the eighth year multiplied by a present value interest factor PVIF. Again, PVIF is defined by $1/(1+r)\uparrow td$ where r is the interest rate, predefined at 10%, and [td] is the number of years which must expire before payments are set to begin, which is the case of FIG. 6 is seven years. Thus, the present investment value according to the parameters defined for FIG. 6 is $127.61, which will produce a $100 distribution in years eight through ten.

Figure 7:
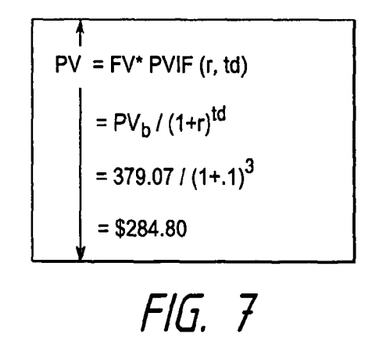
FIG. 7 is a formula depicting the present value for a $379.07 lump sum cash flow at year three.

FIGS. 7-10 are formula for determining present value for cash flow durations of five years, defined in FIG. 2. FIG. 7 depicts a formula for a present value PV in which payments of $100.00 are to begin on annual basis beginning in the fourth year. PV is determined by multiplying the present value for cash flow PVb with the present value interest factor PVIF. PVIF is still determined according to the formula $1/(1+r)\uparrow t$ where r is the interest rate and t is the number of years which must expire before payments are set to begin. In the case of the formula of FIG. 7, r equals 10% and [td] is three years, thus rendering a present investment value of $284.80, which will produce an annual distribution of $100 for years four through eight.

Figure 8:
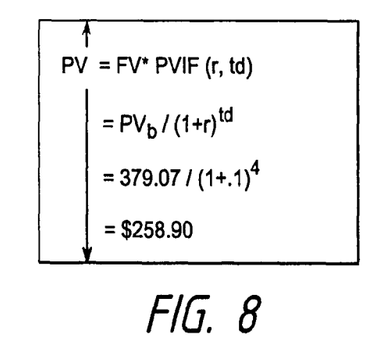
FIG. 8 is a formula depicting the present value for a $379.07 lump sum cash flow at year four.

FIG. 8 shows a formula for a present value PV in which payments of $100.00 are to begin on annual basis after the expiration of the fourth year. PV is determined by multiplying the present value for cash flow PVb with the present value interest factor PVIF. PVIF is still determined according to the formula $1/(1+r)\uparrow t$ where r is the interest rate and t is the number of years which must expire before payments are set to begin. In the case of the formula of FIG. 8, r equals 10% and t is four years, thus rendering a present investment value of $258.90 which is required for $100 distributions in years five through nine.

Figure 9:
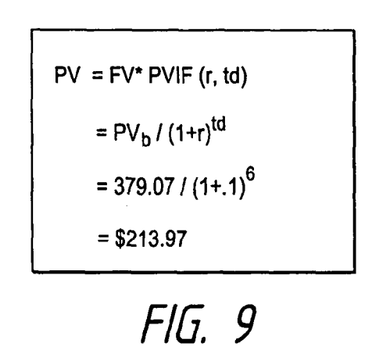
FIG. 9 is a formula depicting the present value for a $379.07 lump sum cash flow at year six.

FIG. 9 shows a formula for a present value PV in which payments of $100.00 are to begin on annual basis after the expiration of the sixth year. PV is determined by multiplying the present value for cash flow or an annuity PVb with the present value interest factor PVIF. PVIF is still determined according to the formula $1/(1+r)\uparrow t$ where r is the interest rate and t is the number of years which must expire before payments are set to begin. In the case of the formula of FIG. 9, r equals 10% and td six years, thus rendering a present investment value of $213.97 for equal $100 distributions in years seven through eleven.

Figure 10:
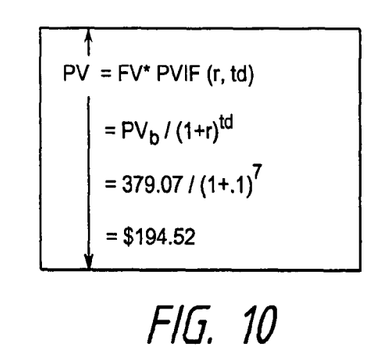
FIG. 10 is a formula depicting the present value for a $379.07 lump sum cash flow at year seven.

FIG. 10 depicts a formula for a present value PV in which payments of $100.00 are to begin on annual basis after the expiration of the seventh year. PV is determined by multiplying the present value for cash flow PVb with the present value interest factor PVIF. PVIF is still determined according to the formula $1/(1+r)\uparrow t$ where r is the interest rate and t is the number of years which must expire before payments are set to begin. In the case of the formula of FIG. 10, r equals 10% and td is seven years, thus rendering a present value of $194.52, which is the present investment amount required for an annual $100 distribution in years eight through twelve.

Figure 11:
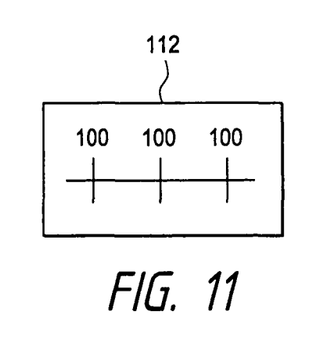
FIG. 11 is a distribution bar showing equal annual distributions of $100 over a three year period.
Figure 12:
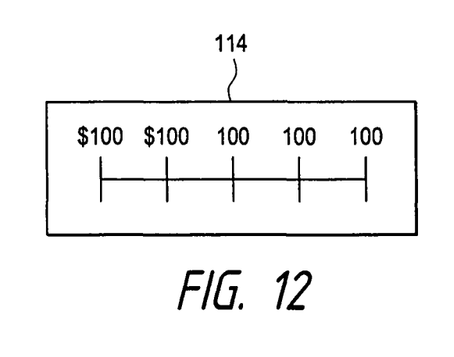
FIG. 12 is a distribution bar showing equal annual distributions of $100 over a five year period.

FIG. 11 depicts a substrate having a distribution bar 112 imprinted thereon, in which three equidistant spaced $100 imprints represent sequential annual $100 distributions. FIG. 12 depicts a substrate having a distribution bar 114 imprinted thereon in which equidistant spaced $100 imprints represents five consecutive annual $100 distributions. The distribution bars 112, 114 depicted in FIGS. 11 and 12 help the student visualize and manually adjust the proper payments in accordance with the problem presented. Typically, the distribution bar is moved to show where a first payment is set to begin for a particular problem.

It is desirable that each of the formulae 110 depicted in FIGS. 1-10 and the distribution bar 112, 114 are indicated on their own magnetic substrates and that the solution surface also be of a magnetic material so that the various selected formula will not easily slip or move from their placement on the solution surface.

The present invention pertaining to annuity type problems will now be described according to a number of examples. The first example is a word problem in which you must determine the present value of a $100 per year payment for three years beginning in year four in which the present investment will earn a 10% rate of return. The solution of such problem is depicted in FIG. 15.

Figure 15:
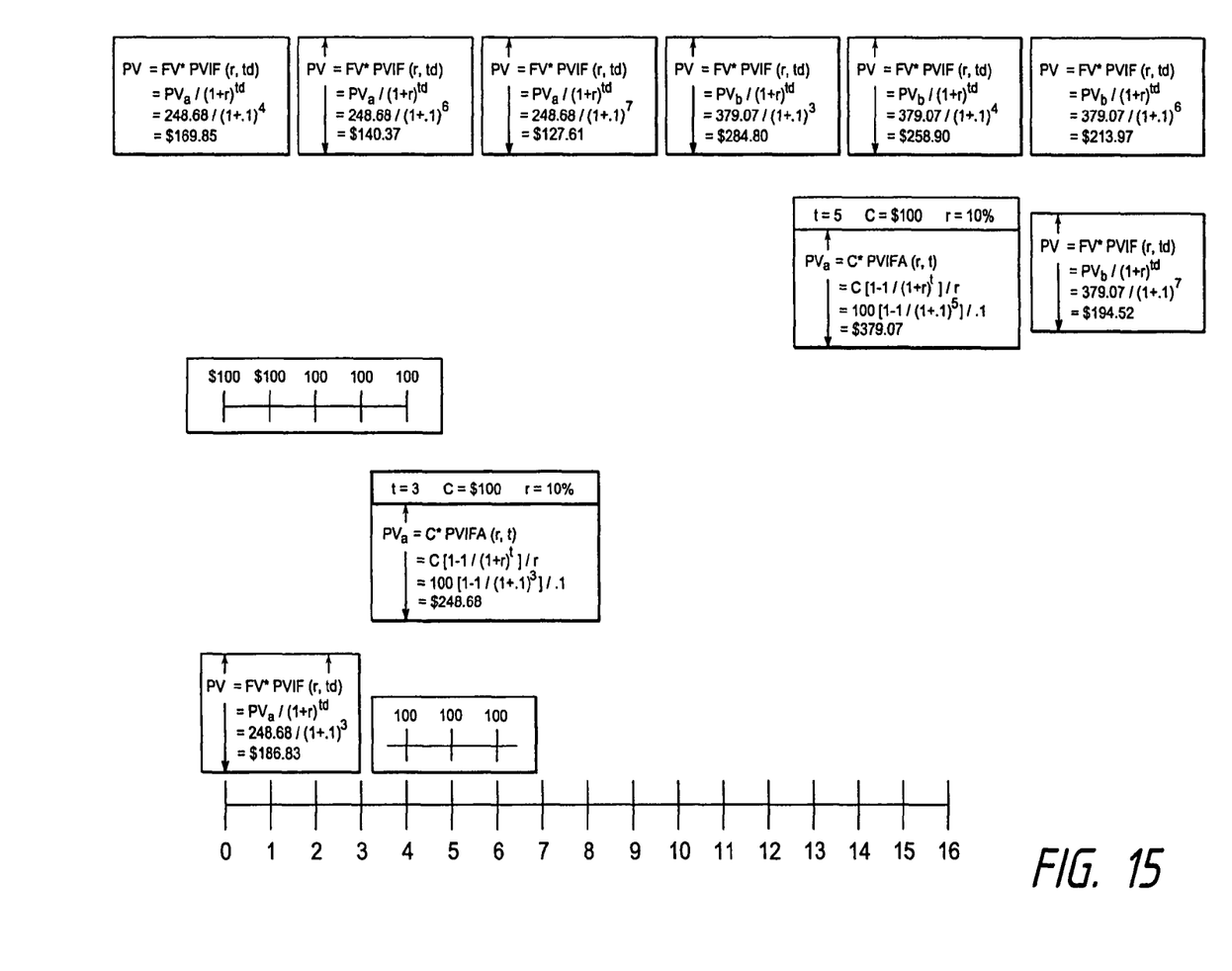
FIG. 15 is a diagram showing the manipulations of various formula and distribution bar on the work area of FIG. 13 in accordance with a first and third example as described in the description.

Referring to FIG. 15, first the distribution bar 112 in FIG. 11 must be selected and the first $100 dollar value must be placed above number four on the timeline, which signifies that the first $100 payment begins after the expiration of the third year. Next, a preliminary formula depicted in FIG. 1 must be selected and placed above the number three on the timeline, which denotes the present value of cash flow to produce the payment schedule beginning from one year of investment. The preliminary formula depicted in FIG. 1 is selected because it is used to determine the present value of cash flow for a duration of three year at an interest rate of 10% and an annual payment of $100. Next, the formula depicted in FIG. 3 is selected and placed over the zero, or present date on the number line, because this formula is used to determine the present investment value based on the present value of cash flow where payments are set to begin at the end of the fourth year or beginning in the fifth year. Thus, the present investment value is $186.83.

Figure 16:
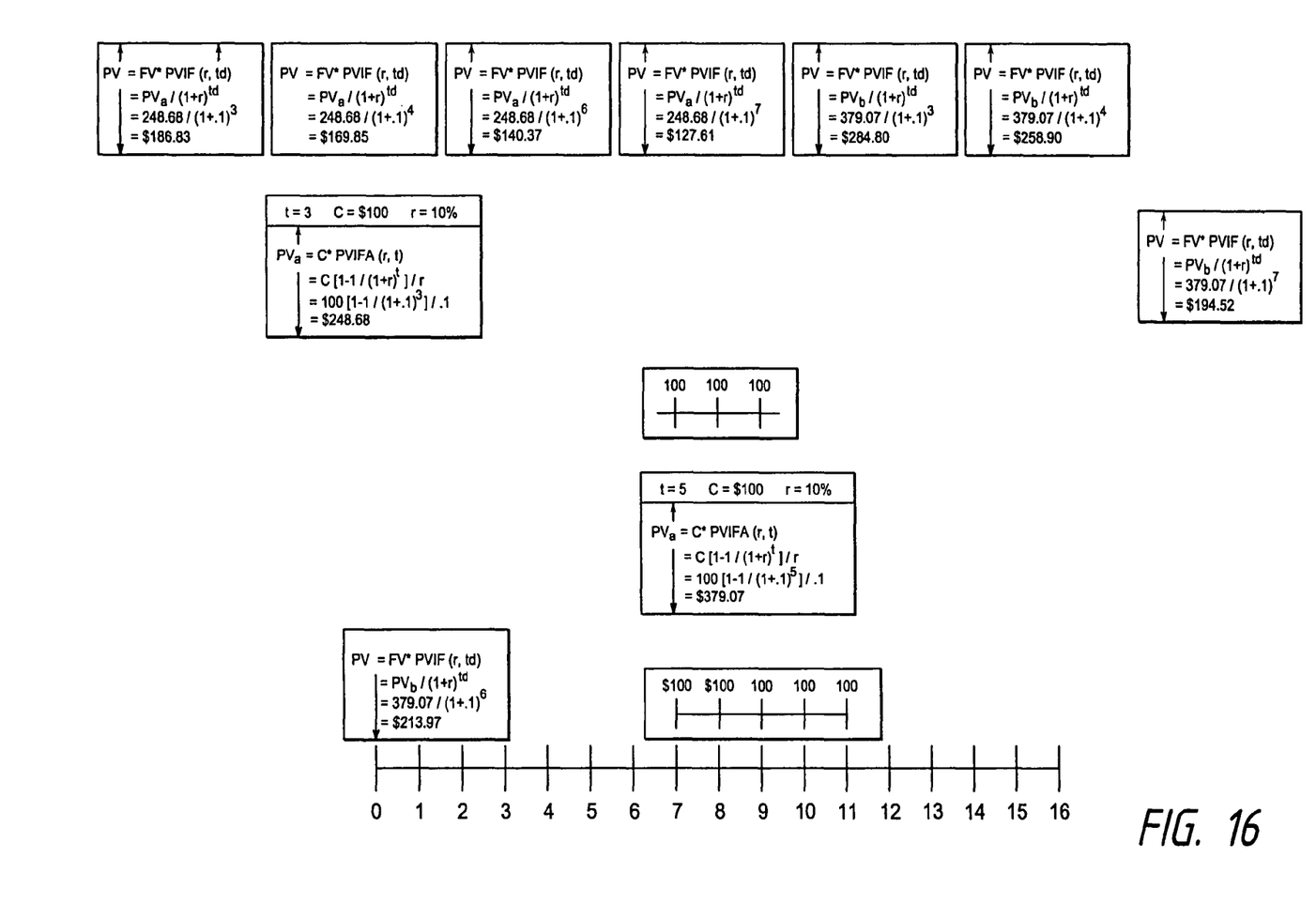
FIG. 16 is a diagram showing the manipulations of various formula and distribution bar on the work area of FIG. 13 in accordance with a second example as described in the description.

Turning to the next example for which the solution is depicted in FIG. 16, the present value must be determined in which an annual payment of $100 for five years is set to begin in the seventh year. That distribution bar in FIG. 12 is selected and placed so that the first $100 value is directly over the number six on the timeline. The preliminary formula of FIG. 2 is selected to determine the present value of cash flow for a five year duration at 10%. This preliminary formula is placed over the number six on the timeline because this would be the investment required in year six to produce the desired cash flow beginning in year seven. Next, the final formula to determine present investment value according to FIG. 9 is selected and placed over the zero, or present date, on the number line. Thus, the present value of this example is $213.97.

Referring back to FIG. 15, the next example shows that the present problem set can be used for annual payments having values that are tenfold multiples of $100. In this example, the present value must be determined in which annual payments of $10,000 are to be made for a duration of three years beginning in year four in which the present investment will earn 10%. Again the distribution bar of FIG. 11 is selected and placed so that the first $100 value is directly over the four on the timeline. The formula in FIG. 1 is selected and placed over the number three on the timeline. Then the formula depicted in FIG. 3 is selected and placed over the zero, or present date on the time line. The pre-solved solution shows that the present value is $186.83 but this must be multiplied by $100 because of the annual payments being $10,000 and not $100. Thus, the present value is $18,683.00.

One final example of the annuity type problem set of the present invention is to determine the present value at 10% interest of a $100 annual payment for eight years beginning in year four. In this example, the problem is now divided into two parts. In the first part, the present value of years four through six will first be determined. In the second part, the present value of years beginning in year seven through year eleven will be determined. Then the present value will be determined by adding together the two present values.

Figure 17:
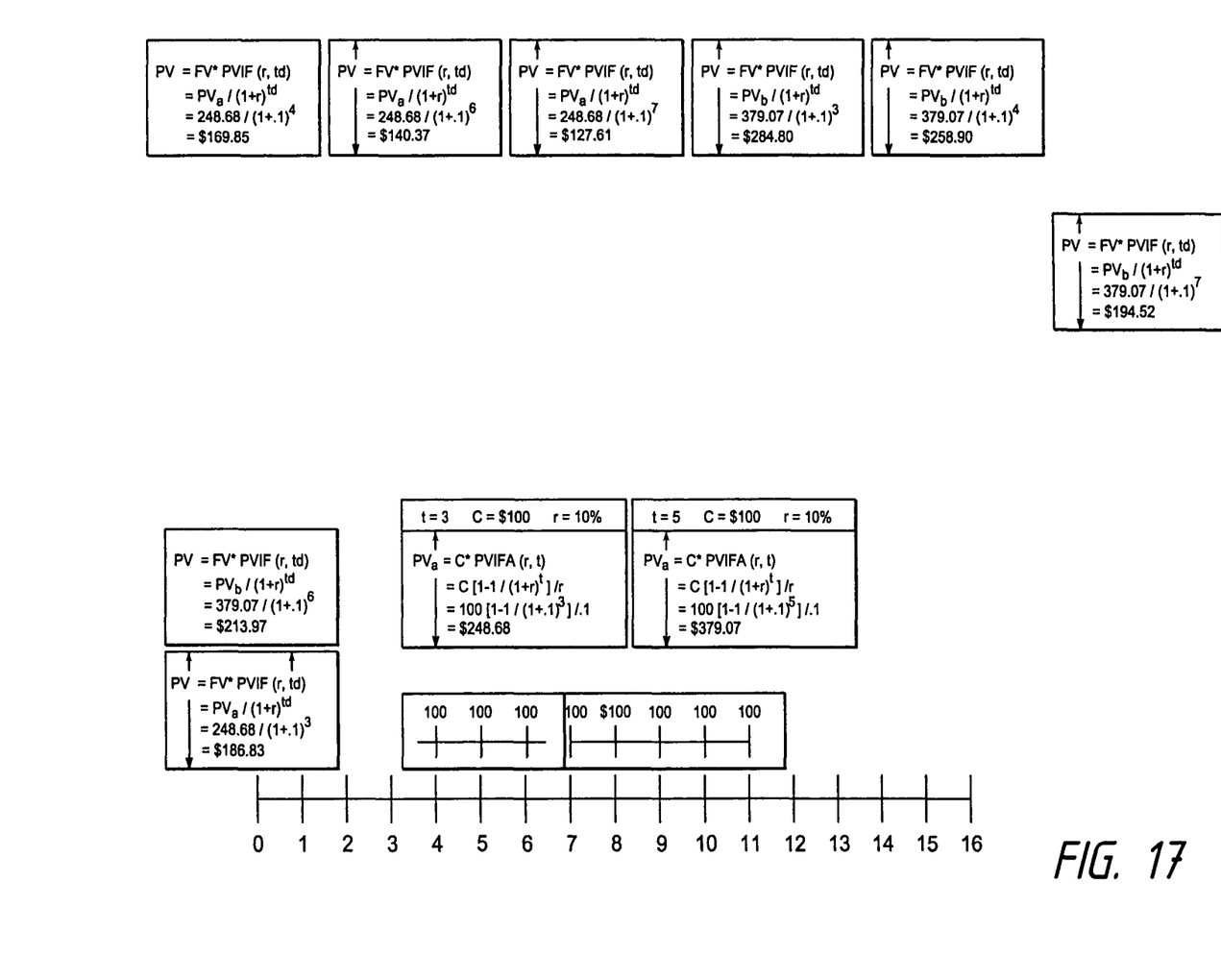
FIG. 17 is a diagram showing the manipulations of various formula and distribution bar on the work area of FIG. 13 in accordance with a fourth example as described in the description.

So that according to the procedures described above and referring to the solution depicted in FIG. 17, the present value of the first part, namely payments beginning in year four through six, will be determined to be $186.83 while the present value of the second part will be determined to be $213.97. Thus, the total present value will be $400.80.

A step by step approach dictates that the distribution bar of FIG. 11 is placed on the time line so that the first $100 payment is directly over the number four which signifies that the first payment is after the expiration of the fourth year, or beginning in the fifth year. Next, the preliminary formula depicted in FIG. 1 is selected because it is used to determine the present value of cash flow for a duration of three year at an interest rate of 10% and an annual payment of $100 and placed over the number three on the timeline. Next, the formula depicted in FIG. 3 is selected and placed over the zero, or present date on the number line, because this formula is used to determine the present value where payments are set to begin at the end of the fourth year or beginning in the fifth year. Thus, the present value is $186.83 for the payments in year four through six.

Next, the distribution bar of FIG. 12 is placed on the timeline so that the first $100 payment is directly over the seven, which denotes payment after the expiration of the seventh year. Next, the preliminary formula of FIG. 2 is selected because it is used to determine the present value of cash flow for a duration of five years at an interest rate of 10% and an annual payment of $100 and placed over the number six on the time line. Then the formula of FIG. 9 is placed above the formula of FIG. 3, because the formula of FIG. 9 is used to determine the present value where payments are set to begin at the expiration of the seventh year. Thus, the present investment value for payments in years seven through eleven is $213.97.

Therefore, the total present investment is the sum of the present investment value for the payments of years four through six and the present investment value for the payments of the years seven through eleven, which is $400.80.

The examples shown and described herein show how the student is able to move the formulas and distribution bars to their appropriate places for the distribution of the annual payments. The student then is able to solve the problems quicker because the formulae are pre-solved for a predetermined set of problems having a predetermined sample range of constant values.

The advantages include being able to solve many more problems in a given time and being able to manually relocate the formulae in both time and space, which allows the student to better grasp the overall concepts being taught, namely how to determine present investment for a future cash flow and exactly when such payments are distributed.

There is not a need to conduct complex calculations with a calculator because the equations are pre-solved. Further, since the user is physically lifting and moving the equations he becomes more intimate and gains a better understanding of the structure, application and reasoning of the equations.

Figure 18:
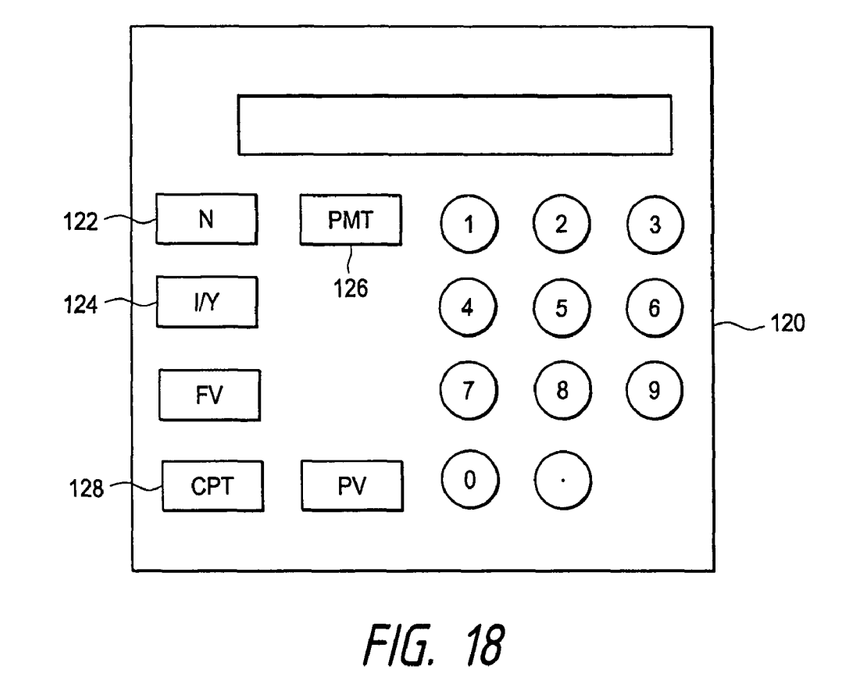
FIG. 18 is a block diagram depicting financial calculator.
Figure 19:
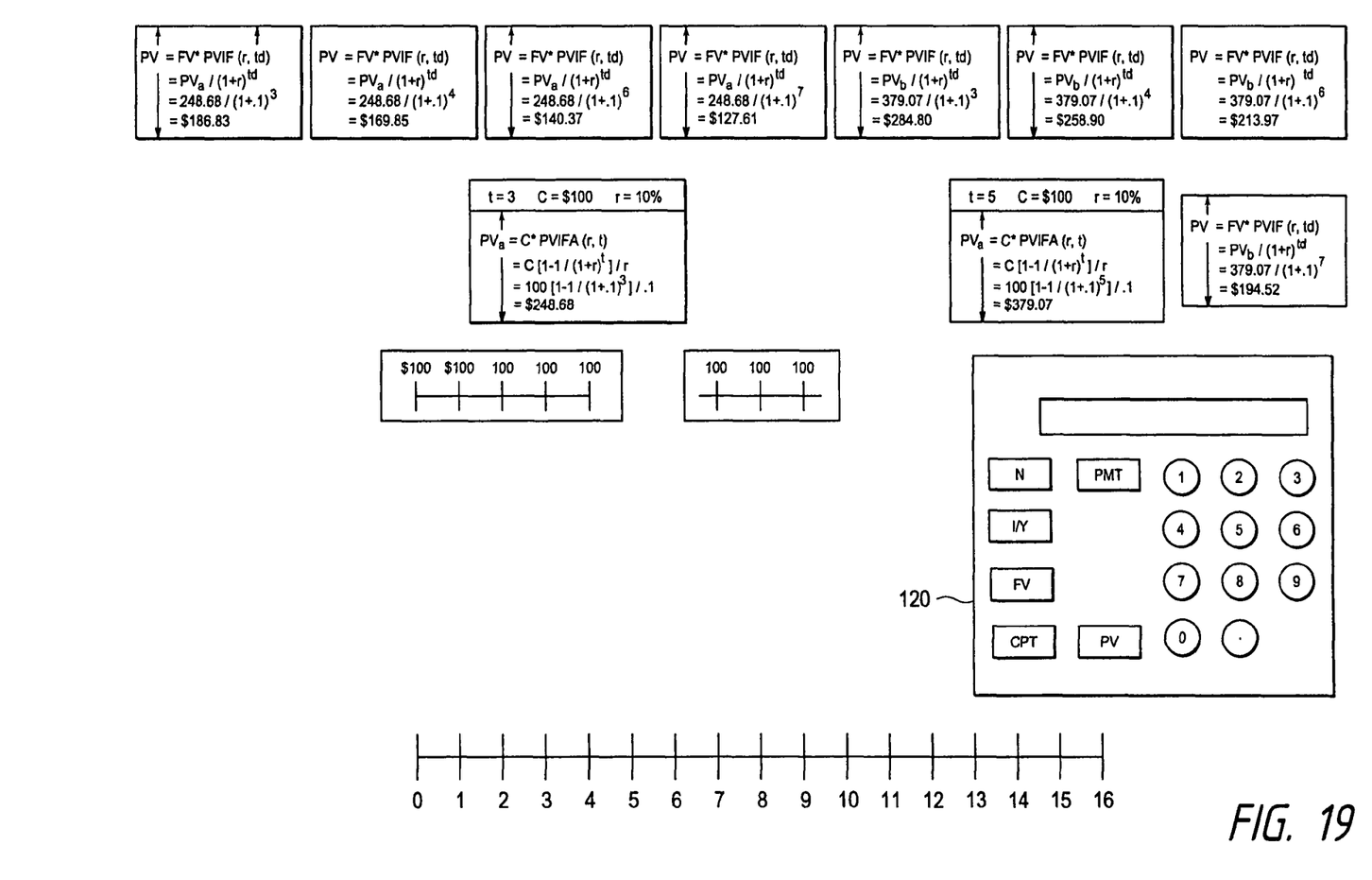
FIG. 19 is a diagram of the work area of FIG. 13 in which the financial calculator depicted in FIG. 18 is disposed therein.

However, in some cases it is desirable to teach the students how to use a financial calculator 120, depicted in FIG. 18. The financial calculator 120 may be physically installed as part of the work area, depicted in FIG. 19, or may be a separate component.

The financial calculator 120 includes a distribution duration entry key 122 represented by the letter N, an interest rate entry key 124 represented by the letters I/Y, an annual distribution value entry key 126 represented by the letters PMT, and a compute payment key 128 represented by the CPT which computes the present value for cash flow.

The present invention is also applicable to other types of word problems. Velocity problems are commonly taught to students in certain mathematics based courses. A problem of the following example type is common: "Jane and here family drove six hours from their home to the beach. The trip is 280 miles long. They first drove at an average speed of 60 mph from home to Smallville where they stopped to pump gas. They then drove at an average speed of 40 mph from Smallville to the beach. How many hours did it take for them to drive from home to Smallville? Find the distance from home to Smallville?"

The solution for this problem will not be presented herein, but one skilled in the art certainly can observe that the present invention provides for this type of problem. The apparatus will utilize velocity formulae and a distance line rather than a time line.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. A problem solving apparatus for assisting a students approach and understanding into solving word problems, said apparatus comprising:
    a work area having a obverse surface;
    a measurement line indicia disposed on the obverse surface, wherein said measurement line is selected from the group consisting essentially of a timeline and a distance line;
    a finite predetermined selection of independent word problems, wherein said finite selection of word problems include a predetermined range of dependent and independent variables; and
    a predetermined set of independently movable substrates having indicia of at least one equation disposed on an obverse surface of each of said movable substrates, wherein said at least one equation is spatially related to said measurement line when correctly solving at least one of said word problems.

2. The apparatus of claim 1, wherein said predetermined set of independently movable substrates further includes at least one preliminary equation on a first substrate and a final equation on a second substrate, wherein said final equation is a function of said preliminary equation.

3. The apparatus of claim 1, further including a data substrate having indicia of at least one set of data, wherein said at least one set of data includes a value for at least one variable.

4. The apparatus of claim 1, wherein said indicia of at least one equation further includes indicia indicative of a solution thereof for a preselected range of variables.

5. The apparatus of claim 1, wherein said solution surface and said predetermined set of independently movable substrates further include magnetic composition.

6. The apparatus of claim 1, wherein at least one of said predetermined set of independently movable substrates includes a portion of its outer surface having a first contour and wherein at least a second of said predetermined set of independently movable substrates includes a portion of its outer surface having a second contour, wherein said portion of said first contour mates with said portion of said second contour.

7. The apparatus of claim 1, wherein at least one of said predetermined set of independently movable substrates includes a predefined colored background, and wherein at least a second of said predetermined set of independently movable substrates includes a second predefined colored background, and wherein said colored backgrounds unite by definition.

8. The apparatus of claim 1, wherein said work area further includes a calculator disposed therein.

9. A problem solving apparatus for assisting a students approach and understanding into solving cash flow related word problems, said apparatus comprising:
    a work area having a obverse surface;
    a time line indicia disposed on the obverse surface;
    a finite predetermined selection of independent cash flow word problems, wherein said finite selection of cash flow word problems include a predetermined range of dependent and independent variables; and
    a predetermined set of independently movable substrates having indicia of at least one equation disposed on an obverse surface of each of said movable substrates, wherein said at least one equation is spatially related to said time line when correctly solving at least one of said cash flow word problems.

10. The apparatus of claim 9, wherein a first of said at least one equation is indicative of an equation for determining the present value of a predetermined cash flow.

11. The apparatus of claim 10, wherein a second of said at least one equations is indicative of an equation for determining the present investment required to produce said predetermined cash flow in a future time period, wherein said second equation is a function of said first equation.

12. The apparatus of claim 11, further including a data substrate having indicia of said cash flow, wherein said data substrate is spatially related to said time line.

13. The apparatus of claim 11, wherein said first and second equations further includes indicia indicative of solutions for said equations for a preselected value set of said variables.

14. The apparatus of claim 9, wherein said solution surface and said predetermined set of independently movable substrates further include magnetic composition.

15. The apparatus of claim 9, wherein said predetermined range of variables are selected from the group consisting essentially of a number of annual distributions, year in which payment is set to begin, an annual distribution value and an interest rate.

16. The apparatus of claim 12, wherein said data substrate further includes indicia of a predetermined distribution amount for a predetermined duration, wherein said predetermined distribution amount includes equidistant spaced equal installment amounts and wherein said timeline includes equidistant spaced consecutive numbered integers which correspond to years, such that said equidistant spaced installment amounts between adjacent installments and said equidistant spaced integers between adjacent integers are separated by the same physical distance.

17. The apparatus of claim 9, wherein said work area further includes a financial calculator disposed therein.

18. A method of solving a word problem in which a plurality of known variables having predetermined values are provided and at least one unknown must be solved for, wherein at least one preliminary substrate includes indicia of at least one preliminary equation disposed thereon and at least one final substrate having indicia of at least one final equation are provided, said method comprising:
    selecting said at least one preliminary substrate and moving said at least one preliminary substrate to at least one preliminary solution position;
    solving said at least one preliminary equation;
    selecting said at least one final substrate and moving said at least one final substrate to at least one final solution position; and
    solving said at least one final equation.

19. The method of claim 18, wherein the step of moving said at least one preliminary substrate to at least one preliminary solution position, further includes the step of moving said at least one preliminary substrate to an appropriate placement relative to indicia of a chart on said solution surface.

20. The method of claim 18, further including the step of positioning at least one data substrate relative to indicia of a measurement line on said solution surface.

* * * * *